United States Patent [19]
Kitora

[11] Patent Number: 5,148,057
[45] Date of Patent: Sep. 15, 1992

[54] CIRCUIT APPARATUS FOR DETECTING PRECEDING VALUE ONE

[75] Inventor: Yoshitsugu Kitora, Ikeda, Japan

[73] Assignee: Ricoh Company, Ltd., Tokyo, Japan

[21] Appl. No.: 700,511

[22] Filed: May 15, 1991

[30] Foreign Application Priority Data

Jun. 6, 1990 [JP] Japan ................................ 2-148006

[51] Int. Cl.⁵ ............................................ H03K 19/01
[52] U.S. Cl. ..................... 307/443; 307/449; 364/715.01
[58] Field of Search ............... 307/443, 448, 449, 451, 307/467; 364/715.01

[56] References Cited

U.S. PATENT DOCUMENTS

| | | | |
|---|---|---|---|
| 3,571,580 | 3/1971 | Buchan et al. | 364/715.01 |
| 4,802,108 | 1/1989 | Bagdis et al. | 364/715.01 |
| 5,075,879 | 12/1991 | Anderson | 364/715.01 |

FOREIGN PATENT DOCUMENTS 0148980 8/1984 Japan ............................. 364/715.01

*Primary Examiner*—David Hudspeth
*Attorney, Agent, or Firm*—Cooper & Dunham

[57] ABSTRACT

A circuit apparatus for detecting a preceding value "1" has a preceding value "1" detecting circuit for dividing detected data constructed by plural bits into blocks every plural bits from an upper bit side, the preceding value "1" detecting circuit detecting the preceding value "1" by bit data supplied every divided block and a detecting signal indicative of value "1"; and a value "1" detecting signal transmitting circuit for detecting whether all the bit data supplied to the preceding value "1" detecting circuit at the preceding stage show value "0" or not, the value "1" detecting signal transmitting circuit transmitting the detecting signal indicative of value "1" as a basis of the detection of the preceding value "1" to the preceding value "1" detecting circuit at the next stage on the basis of detected results.

3 Claims, 3 Drawing Sheets

CIRCUIT APPARATUS FOR DETECTING PRECEDING VALUE ONE

BACKGROUND OF THE INVENTION

1. Field of the Invention

The present invention relates to a circuit apparatus for detecting a preceding value "11" in which a bit having a first value "1" is detected from a most significant bit with respect to arbitrary supplied data.

2. Description of the Related Art

In a general circuit apparatus for detecting a preceding value "1", an operation for detecting the preceding value "1" is performed every one bit data in a direction from most significant bit data to least significant bit data. A detecting signal indicative of value "1" is transmitted from an upper bit side of each one-bit detecting circuit for detecting the preceding value "1" to a lower bit side thereof. Accordingly, the number of gates for receiving the detecting signal indicative of value "1" is increased so that it takes much time to detect the preceding value "1".

SUMMARY OF THE INVENTION

It is therefore an object of the present invention to provide a circuit apparatus for detecting a preceding value "1" in which a time required to detect the preceding value "1" is reduced.

The above object of the present invention can be achieved by a circuit apparatus for detecting a preceding value "1", comprising a preceding value "1" detecting circuit for dividing detected data constructed by plural bits into blocks every plural bits from an upper bit side, the preceding value "1" detecting circuit detecting the preceding value "1" by bit data supplied every divided block and a detecting signal indicative of value "1"; and a value "1" detecting signal transmitting circuit for detecting whether all the bit data supplied to the preceding value "1" detecting circuit at the preceding stage show value "0" or not, the value "1" detecting signal transmitting circuit transmitting the detecting signal indicative of value "1" as a basis of the detection of the preceding value "1" to the preceding value "1" detecting circuit at the next stage on the basis of detected results.

In the above structure, the preceding value "1" detecting circuit judges whether there is value "1" or not with respect to one of the bit data supplied to the divided blocks. The preceding value "1" detecting circuit begins to detect the preceding value "1" from a most significant bit side of the detected data. The preceding value "1" detecting circuit transmits a signal indicative of a first value "1" to an output terminal corresponding to a bit providing the first value "1". The value "1" detecting signal transmitting circuit judges whether all the detected data supplied to the preceding value "1" detecting circuit at the preceding stage show value "0" or not. The value "1" detecting signal transmitting circuit transmits the detecting signal indicative of value "1" as a basis of the detection of the preceding value "1" to the preceding value "1" detecting circuit at the next stage on the basis of the judged results. Thus, the preceding value "1" detecting circuit processes plural bit data with respect to the detected data. The value "1" detecting signal transmitting circuit transmits the detecting signal indicative of value "1" based on these plural bit data. Accordingly, the number of gates for transmitting the detecting signal indicative of value "1" therethrough is reduced as the number of bits transmitted to the preceding value "1" detecting circuit is increased.

In accordance with the above structure, a time required to detect the preceding value "1" is reduced.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a circuit apparatus for detecting a preceding value "1" in the present invention will next be described in detail with reference to the accompanying drawings.

Figure 1:
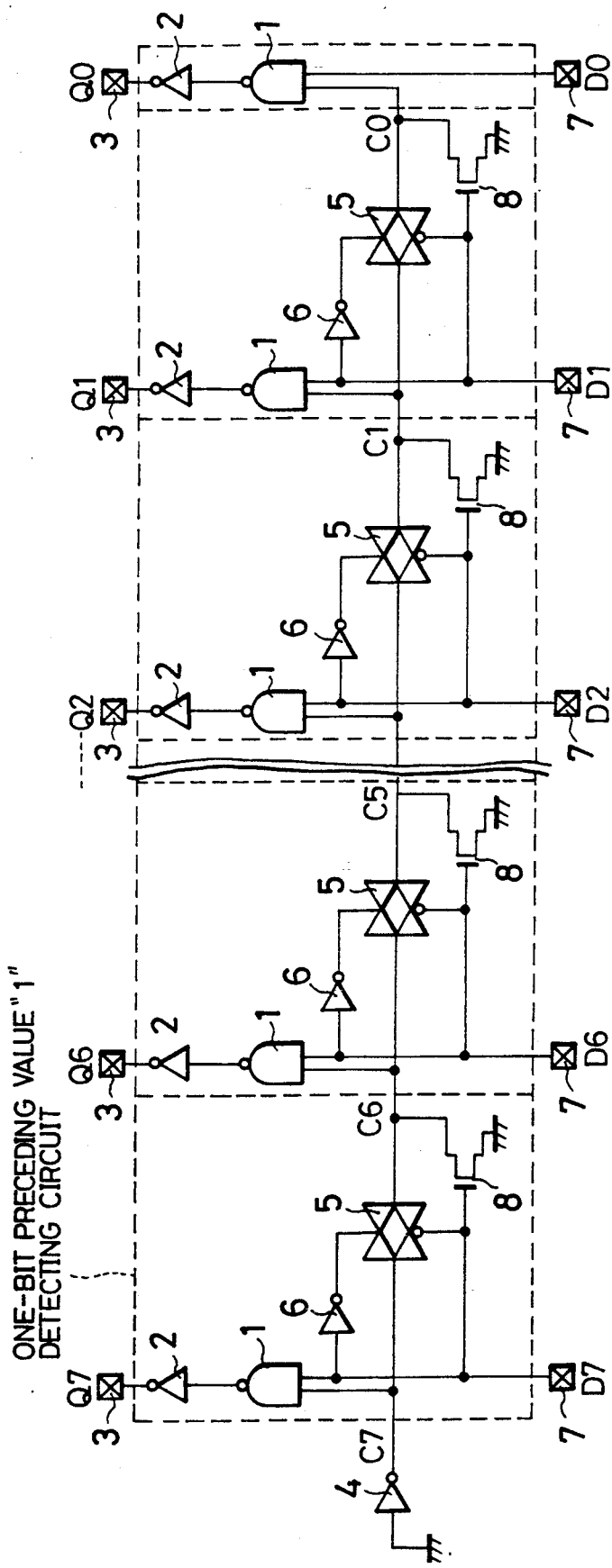
FIG. 1 is a logic circuit diagram of a general circuit apparatus for detecting a preceding value "1"

FIG. 1 shows a general circuit apparatus for detecting a preceding value "1" when detected data are constructed by e.g., 8 bits. Circuit structures are equal to each other every bit of the detected data except for a detecting circuit receiving data D0 of a least significant bit. Accordingly, detecting circuits receiving bit data D5 to D3 are omitted in FIG. 1 when data of a most significant bit are set to D7.

The construction of a one-bit circuit for detecting a preceding value "1" and receiving the respective bit data will next be described. An output side of a detecting circuit for processing bit data located upward by one digit is connected to a transmission gate 5 and a NAND circuit 1 connected to a bit data input terminal 7 for receiving the bit data. An output side of the NAND circuit 1 is connected to an output terminal 3 for outputting detected results through an inverter 2. In the one-bit circuit for detecting a preceding value "1" with respect to the most significant bit, the NAND circuit 1 is connected to an output side of an inverter 4. An input side of the inverter 4 is connected to the ground. Such a NAND circuit 1 performs a logic operation with respect to the bit data and an output signal of the one-bit preceding value "1" detecting circuit on an upper bit side. The NAND circuit 1 begins to detect the preceding value "1" from the data of the most significant bit. When these data of the most significant bit show a first value "1", the NAND circuit 1 outputs a signal having a low voltage level. The NAND circuit 1 outputs a signal having a high voltage level in a case except for the above case in which the data of the most significant bit show the first value "1".

The bit data input terminal 7 is connected to an enable terminal of the above transmission gate 5 through an inverter 6. The bit data input terminal 7 is also connected to a disable terminal of the transmission gate 5 and a gate of a MOS transistor 8 of an N-channel having a drain connected to the ground. The MOS transistor of an N-channel is called an NMOS transistor in the following description. When a signal indicative of value "0" is transmitted to the bit data input terminal 7, the transmission gate 5 is turned on and transmits a signal indicative of value "1" and outputted from the one-bit preceding value "1" detecting circuit on an upper digital side. The transmission gate 5 is turned off when a signal indicative of value "1" is transmitted to the bit data input terminal 7.

An output side of the transmission gate 5 is connected to a source of the NMOS transistor 8 and is also connected to an input side of a one-bit preceding value "1" detecting circuit on a lower digit side. When the above signal indicative of value "1" for turning the transmission gate 5 off is transmitted to the bit data input terminal 7, the NMOS transistor 8 is turned on so that a signal having a low voltage level is transmitted to the one-bit preceding value "1" detecting circuit on the lower digit side. Such detecting circuits are connected in series from the most significant bit to a second bit from the least significant bit side.

A one-bit preceding value "1" detecting circuit for receiving data of the least significant bit is constructed by only a NAND circuit 1 and an inverter 2.

The above circuit apparatus for detecting a preceding value "1" is operated as follows.

In the one-bit preceding value "1" detecting circuit for processing data of the most significant bit, the NAND circuit 1 receives a signal having a high voltage level through the inverter 4. For example, when data D7 of the most significant bit show value "0", the NAND circuit 1 outputs a signal having a high voltage level. Accordingly, a signal having a low voltage level is transmitted to the detecting result output terminal 3 so that it is confirmed that the data of the most significant bit do not show value "1". Since the bit data D7 show value "0", the transmission gate 5 is turned on and the NMOS transistor 8 is turned off. Accordingly, the signal of a high voltage level inputted to the transmission gate 5 is transmitted to a one-bit preceding value "1" detecting circuit for receiving bit data D6.

For example, when the bit data D6 show value "1", a NAND circuit 1 outputs a signal having a low voltage level so that a signal having a high voltage level is transmitted to be detecting result output terminal 3. Thus, it is confirmed that the bit data D6 show value "1". Since the bit data D6 show value "1", a transmission gate 5 is turned off and an NMOS transistor 8 is turned on. Accordingly, a signal having a low voltage level is transmitted to an input side of a one-bit preceding value "1" detecting circuit for receiving bit data D5.

For example, when the bit data D5 show value "0", a NAND circuit 1 outputs a signal having a high voltage level so that a signal having a low voltage level is transmitted to a detecting result output terminal 3. Accordingly, it is confirmed that the bit data D5 show value "0". Since the bit data D5 show value "0", a transmission gate 5 is turned on and an NMOS transistor 8 is turned off. Accordingly, a signal having a low voltage level is transmitted to an input side of a one-bit preceding value "1" detecting circuit for receiving bit data D4.

For example, when the bit data D4 show value "1", a NAND circuit 1 outputs a signal having a high voltage level so that a signal having a low voltage level is transmitted to a detecting result output terminal 3. Thus, it is confirmed that the bit data D4 do not show a first value "1". Since the bit data D6 show the value "1", a transmission gate 5 is turned off and an NMOS transistor 8 is turned on. Accordingly, a signal having a low voltage level is transmitted to an input side of a one-bit preceding value "1" detecting circuit for receiving bit data D3.

The above-mentioned operations are similarly performed with respect to bit data D3, D2, D1.

As mentioned above, in the general preceding value "1" detecting circuit apparatus, the operation for detecting a preceding value "1" is performed every one bit data in a direction from the most significant bit data to the least significant bit data. A detecting signal indicative of the value "1" is transmitted from an upper bit side of each of the one-bit preceding value "1" detecting circuits to a lower bit side thereof. Accordingly, the number of gates for receiving the detecting signal indicative of the value "1" is increased so that it takes much time to detect the preceding value "1".

Figure 2:
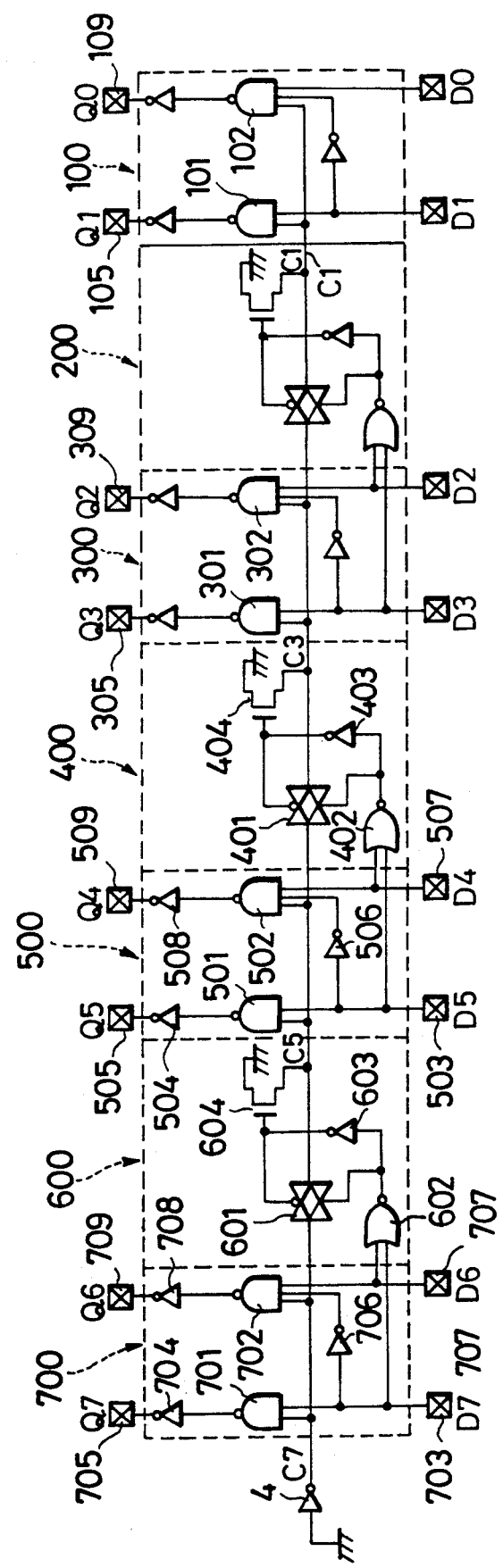
FIG. 2 is a logic circuit diagram of a circuit apparatus for detecting a preceding value "1" in accordance with a first embodiment of the present invention.

FIG. 2 shows a circuit apparatus for detecting a preceding value "1" in accordance with one embodiment of the present invention. In FIG. 2, the same constructional portions as those in FIG. 1 are designated by the same reference materials.

In this embodiment, a circuit for detecting a preceding value "1" is constructed in a unit of two bits and is called a two-bit preceding value "1" detecting circuit in the following description. A two-bit value "1" detecting signal transmitting circuit is connected between respective two-bit preceding value "1" detecting circuits to transmit a detecting signal indicative of value "1" therebetween. Thus, the number of gates for transmitting a detecting signal indicative of a preceding value "1" therethrough is reduced to half the number of these gates in the general preceding value "1" detecting circuit. In this embodiment, detected data are constructed by eight bits, but the present invention is not limited to this case.

In FIG. 2, a two-bit preceding value "1" detecting circuit 700 processes data of an eighth bit as a most significant bit and data of a seventh bit and has constructional portions 701 to 709. A two-bit preceding value "1" detecting circuit 500 processes data of sixth and fifth bits and has constructional portions 501 to 509. A two-bit preceding value "1" detecting circuit 300 processes data of fourth and third bits and has constructional portions 301 to 309. A two-bit preceding value "1" detecting circuit 100 processes data of a second bit and data of a least significant bit and has constructional portions 101 to 109. The respective two-bit preceding value "1" detecting circuits have the same construction.

A two-bit value "1" detecting signal transmitting circuit 600 connects the two-bit preceding value "1" detecting circuits 700 and 500 and has constructional portions 601 to 604. A two-bit value "1" detecting signal transmitting circuit 400 connects the two-bit preceding value "1" detecting circuits 500 and 300 and has constructional portions 401 to 404. A two-bit value "1" detecting signal transmitting circuit 200 connects the two-bit preceding value "1" detecting circuits 300 and 100 and has constructional portions 201 to 204.

For example, the two-bit preceding value "1" detecting circuit 700 and the two-bit value "1" detecting signal transmitting circuit 600 are constructed as follows.

An input side of an inverter 4 is connected to the ground. An output side of the inverter 4 is connected to input sides of NAND circuits 701 and 702 and an input side of a transmission gate 601.

An input side of the NAND circuit 701 is connected to a bit data input terminal 703 for receiving bit data D7. The NAND circuit 701 performs a logic operation with respect to the bit data D7 and a signal having a high voltage level and transmitted from the inverter 4. An output side of this NAND circuit 701 is connected to a detecting result output terminal 705 through an inverter 704.

An input side of the NAND circuit 702 is connected to the bit data input terminal 703 through an invertor 706 and is also connected to a bit data input terminal 707 for receiving bit data D6. This NAND circuit 702 performs a logic operation based on the bit data D6, an inverted signal of the bit data D7, and the signal having a high voltage level and transmitted from the inverter 4. An output side of this NAND circuit 702 is connected to a detecting result output terminal 709 through an inverter 708.

The two-bit preceding value "1" detecting circuit 700 is formed by these constructional portions 701 to 709.

The bit data input terminals 703 and 707 are connected to an input side of a NOR circuit 602 constituting the two-bit value "1" detecting signal transmitting circuit 600. An output side of the NOR circuit 602 is connected to an enable terminal of the above transmission gate 601 and is also connected to a disable terminal of the transmission gate 601 and a gate of an NMOS transistor 604 through an inverter 603. A drain of the NMOS transistor 604 is connected to the ground and a source thereof is connected to an output side of the transmission gate 601. The output side of the transmission gate 601 is connected to an input side of a two-bit preceding value "1" detecting circuit 500. Namely, the output side of the transmission gate 601 is connected to input sides of NAND circuits 501 and 502. The two-bit preceding value "1" detecting circuit 500 detects a preceding value "1" with respect to bit data D5 and D4 and has the same construction as the above two-bit preceding value "1" detecting circuit 700. The above constructional portions 601 to 604 constitute the two-bit value "1" detecting signal transmitting circuit 600.

Similarly, two-bit preceding value "1" detecting circuits and two-bit value "1" detecting signal transmitting circuits respectively having the above constructions are alternately connected to each other. In this embodiment, four two-bit preceding value "1" detecting circuits and three two-bit value "1" detecting signal transmitting circuits are disposed.

The operation of the above preceding value "1" detecting circuit apparatus will next be described.

Similar to the general preceding value "1" detecting circuit apparatus, the preceding value "1" detecting circuit apparatus in this embodiment detects a preceding value "1" with respect to detected data in a direction from a most significant bit of the detected data to a lower bit thereof. For example, when bit data D7 show value "0", a detecting signal of the preceding value "1" having a high voltage level is transmitted to the NAND circuit 701 from the inverter 4. Accordingly, the NAND circuit 701 outputs a signal having a high voltage level so that a signal having a low voltage level is transmitted to the detecting result output terminal 705 through the inverter 704. Thus, it is confirmed that the bit data D7 do not show value "1".

When bit data D6 also show value "0", the signal having a high voltage level is transmitted to the NAND circuit 702 from the inverter 4 and a signal having a high voltage level is transmitted to the NAND circuit 702 from the bit data input terminal 703 through the inverter 706. Further, a signal having a low voltage level is transmitted to the NAND circuit 702 from the bit data input terminal 707. Accordingly, the NAND circuit 702 outputs a signal having a high voltage level. Therefore, a signal having a low voltage level is transmitted to the detecting result output terminal 709. Thus, it is confirmed that the bit data D6 do not show value "1".

As mentioned above, no detecting signal indicative of value "1" with respect to the bit data D7 is transmitted through a gate in the operation for detecting the preceding value "1" with respect to the bit data D6. This construction is different from that of the general circuit apparatus.

The value "0" of the bit data D7 and the value "0" of the bit data D6 are transmitted to the NOR circuit 602 disposed in the two-bit value "1" detecting transmitting circuit 600. Thus, the NOR circuit 602 outputs a signal having a high voltage level. Accordingly, the transmission gate 601 receiving the detecting signal indicative of value "1" is turned on and the NMOS transistor 604 is turned off. Thus, the transmission gate 601 transmits the value "1" detecting signal having a high voltage level and transmitted from the two-bit preceding value "1" detecting circuit 700 to an input side of the two-bit preceding value "1" detecting circuit 500 on the lower bit side.

For example, when bit data D5 show value "1", the value "1" detecting signal having a high voltage level is transmitted to the NAND circuit 501 from the two-bit value "1" detecting signal transmitting circuit 600, and a signal having a high voltage level is transmitted to the NAND circuit 501 from the bit data input terminal 503. Accordingly, the NAND circuit 501 outputs a signal having a low voltage level. Thus, a signal having a high voltage level is transmitted to the detecting result output terminal 505 through the inverter 504. Accordingly, it is confirmed that the bit data D5 show value "1" and the value "1" is first detected from the most significant bit side.

When bit data D4 show value "0", the value "1" detecting signal having a high voltage level is transmitted to the NAND circuit 502 from the two-bit value "1" detecting signal transmitting circuit 600, and a signal having low voltage level is transmitted to the NAND circuit 502 from the bit data input terminal 503 through the inverter 506. Further, a signal having a low voltage level is transmitted to the NAND circuit 502 from the bit data input terminal 507. Accordingly, the NAND circuit 502 outputs a signal having a high voltage level. Thus, a signal having a low voltage level is transmitted to the detecting result output terminal 509. Therefore, it is confirmed that the bit data D4 do not show value "1".

If the bit data D4 also show value "1", the value "1" detecting signal having a high voltage level is transmitted to the NAND circuit 502 from the two-bit value "1" detecting signal transmitting circuit 600, and a signal having a low voltage level is transmitted to the NAND circuit 502 from the bit data input terminal 503 through the inverter 506. Further, a signal having a high voltage level is transmitted to the NAND circuit 502 from the bit data input terminal 507. Accordingly, the NAND circuit 502 outputs a signal having a high voltage level. Therefore, a signal having a low voltage level is transmitted to the detecting result output terminal 509. The bit data D4 show value "1", but the preceding value "1" is already detected by the bit data D5. Thus, it is confirmed that the bit data D4 do not show the preceding value "1".

In the above example, the signal having a high voltage level is transmitted from the bit data input terminal 503 to the NOR circuit 402 constituting the next two-bit value "1" detecting signal transmitting circuit 400. Accordingly, the NOR circuit 402 outputs a signal having a low voltage level irrespective of a signal voltage level of the bit data D4. Thus, the transmission gate 401 is turned off and a signal having a high voltage level is transmitted to a gate of the NMOS transistor 404 through the inverter 403. Accordingly, the NMOS transistor 404 is turned on and an output side of the transmission gate 401 is in a state of a low voltage level. Therefore, a signal having a low voltage level is transmitted to an input side of the preceding value "1" detecting circuit 300 receiving bit data D3 and D2.

Accordingly, the subsequent NAND circuits 301 and 302 transmit a signal having a high voltage level irrespective of value "0" or "1" shown by the bit data D3 and D2. Therefore, both the detecting result output terminals 305 and 309 have a low voltage level. As can be seen from the above description, a signal having a low voltage level is transmitted to a input side of the preceding value "1" detecting circuit 100 receiving bit data D1 and D0 irrespective of value "0" and "1" shown by the bit data D3 and D2. Accordingly, similar to the above case, a signal having a low voltage level is transmitted to each of the detecting result output terminals 105 and 109.

Thus, a signal having a high voltage level is transmitted from only a detecting result output terminal about a bit having a detected value "1" with respect to the detected data. A signal having a low voltage level is transmitted from each of detecting result output terminals about bits except for the above bit having the detected value "1".

Further, the number of transmission gates receiving a detecting signal indicative of the preceding value "1" transmitted from each of the preceding value "1" detecting circuits is reduced to a number less than half the number of transmission gates in the general circuit apparatus. Accordingly, a time required to detect the preceding value "1" can be reduced to a time shorter than half this time in the general circuit apparatus.

Figure 3:
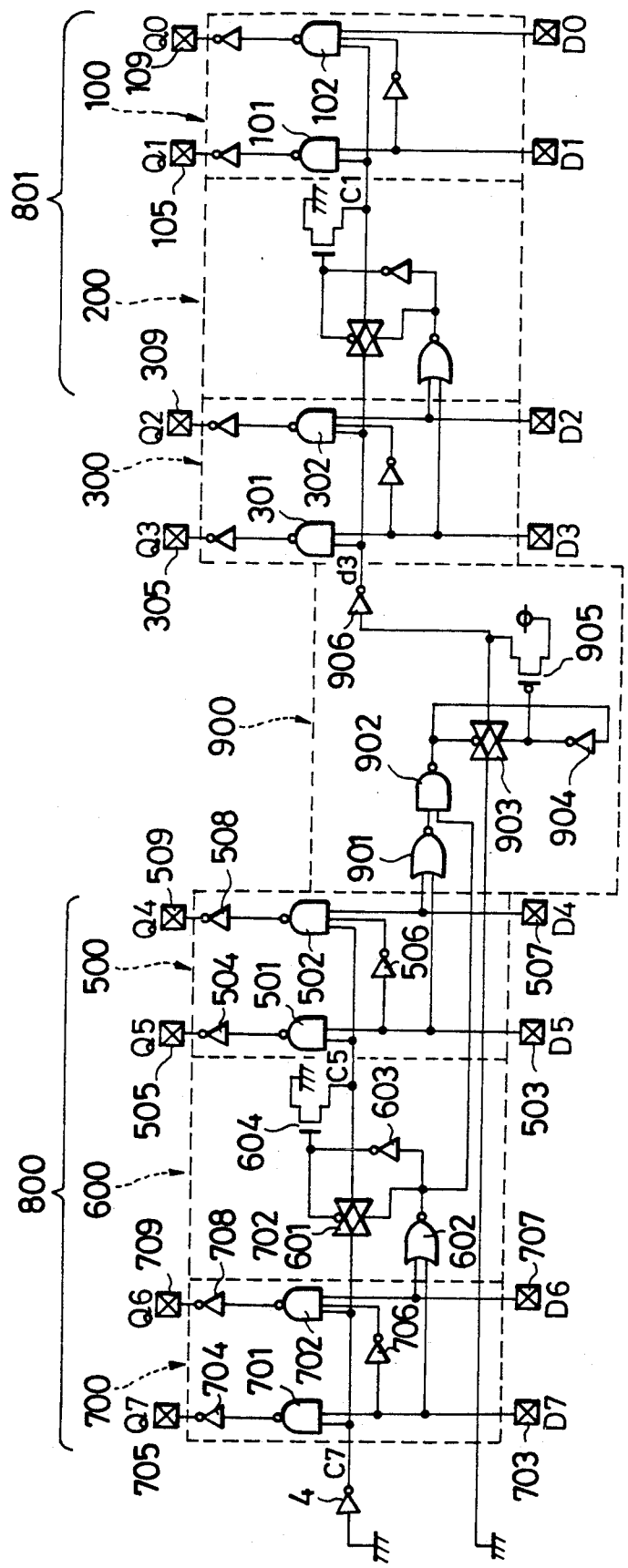
FIG. 3 is a logic circuit diagram of a circuit apparatus for detecting a preceding value "1" in accordance with a second embodiment of the present invention.

FIG. 3 shows a circuit apparatus for detecting a preceding value "1" in accordance with a second embodiment of the present invention. For example, the two-bit preceding value "1" detecting circuit 700, the two-bit value "1" detecting signal transmitting circuit 600 and the two-bit preceding value "1" detecting circuit 500 mentioned above are constructed as one unit. A four-bit preceding value "1" detecting circuit 800 is formed by using four bits of detected data as one block. Similarly, a four-bit preceding value "1" detecting circuit 801 is formed by a two-bit preceding value "1" detecting circuit 300, a two-bit value "1" detecting signal transmitting circuit 200 and a two-bit preceding value "1" detecting circuit 100. A preceding value "1" is detected in each of the four-bit preceding value "1" detecting circuits 800 and 801. Further, the four-bit preceding value "1" detecting circuits 800 and 801 are connected to each other through a four-bit value "1" detecting signal transmitting circuit 900. In FIG. 3, in the four-bit preceding value "1" detecting circuits 800 and 801, the same constructional portions as those in FIG. 2 are designated by the same reference numerals and an explanation thereof is therefore omitted in the following description.

A NOR circuit 901 constitutes the four-bit value "1" detecting signal transmitting circuit 900. Bit data input terminals 503 and 507 are connected to the NOR circuit 901. An output side of the NOR circuit 901 is connected to a NAND circuit 902. An input side of the NAND circuit 902 is connected to an output side of a NOR circuit 602 disposed in the two-bit value "1" detecting signal transmitting circuit 600. An output side of the NAND circuit 902 is connected to a disable terminal of a transmission gate 903. An input side of the transmission gate 903 is connected to the ground and the transmission gate 903 controls the transmission of a detecting signal indicative of value "1" having a low voltage level. The output side of the NAND circuit 902 is also connected to an enable terminal of the transmission gate 903 through an inverter 904. The output side of the NAND circuit 902 is also connected to a gate of a P-channel MOS transistor 905 through the inverter 904. The P-channel MOS transistor is called a PMOS transistor in the following description. The PMOS transistor 905 has a source connected to a power source and a drain connected to an output side of the transmission gate 903. The output side of the transmission gate 903 is connected to an input side of the four-bit preceding value "1" detecting circuit 801 through an inverter 906.

The operation of the above four-bit value "1" detecting signal transmitting circuit 900 will next be described.

The NOR circuit 901 outputs a signal having a high voltage level to the NAND circuit 902 only when both bit data D5 and D4 respectively supplied to the bit data input terminals 503 and 507 show value "0". Similar to the NOR circuit 901, the NOR circuit 602 outputs a signal having a high voltage level to the NAND circuit 902 only when both bit data D7 and D6 show value "0". Accordingly, the NAND circuit 902 outputs a signal having a low voltage level only when there are no data indicative of value "1" with respect to upper four bits of detected data. The transmission gate 903 is turned on and the PMOS transistor 905 is turned off. Thus, the detecting signal indicative of value "1" and having a low voltage level is inverted by the inverter 906 to a signal having a high voltage level and is then transmitted to the nextt four-bit preceding value "1" detecting circuit 801.

In contrast to the above case, when there are data indicative of value "1" in one of the bit data D4 to D7, the NAND circuit 902 outputs a signal having a high voltage level. Accordingly, the transmission gate 903 is turned off and the PMOS transistor 905 is turned on. Thus, a signal having a low voltage level is transmitted to the four-bit preceding value "1" detecting circuit 801 through the inverter 906. In this case, as explained in the first embodiment, the signal having a low voltage level is transmitted to each of NAND circuits 101, 102, 301, 302 irrespective of value "0" or "1" shown by bit data D0 and D3. Accordingly, a signal having a low voltage level is transmitted to each of detecting result output terminals 105, 109, 305, 309. Similar to the first embodiment, in the four-bit preceding value "1" detecting circuit 800, a signal having a high voltage level is transmitted to a detecting result output terminal corresponding to bit data having a first detected value "1" with respect to bit data D4 to D7.

Thus, when the preceding value "1" is detected in a unit of four bits, the number of gates for transmitting a detecting signal indicative of value "1" therethrough is set to one so that it is possible to detect the preceding value "1" at a high speed in comparison with the above circuit apparatus in the first embodiment.

The preceding value "1" is more effectively detected by a hierarchical structure as a bit length of the detected data is increased.

As mentioned above, the circuit apparatus in accordance with the present invention is not constructed such that the preceding value "1" is detected every one bit of the detected data and a detecting signal indicative of "1" is transmitted to a preceding value "1" detecting circuit at the next stage. Namely, in the present invention, the preceding value "1" is detected on the basis of plural bit data with respect to the detected data and the detecting signal indicative of value "1". Further, the above detecting signal indicative of value "1" is transmitted on the basis of the above plural bit data. Accordingly, the number of gates for transmittting the detecting signal indicative of value "1" therethrough can be reduced as the number of bit data processed by the preceding value "1" detecting circuit is increased.

Many widely different embodiment of the present invention may be constructed without departing from the spirit and scope of the present invention. It should be understood that the present invention is not limited to the specific embodiments described in the specification, except as defined in the appended claims.

What is claimed is:

1. A circuit apparatus for detecting a preceding value "1", comprising:

a preceding value "1" detecting circuit for dividing detected data constructed by plural bits into blocks every plural bits from an upper bit side, said preceding value "1" detecting circuit detecting the preceding value "1" by bit data supplied every divided block and a detecting signal indicative of value "1"; and a value "1" detecting signal transmitting circuit for detecting whether all the bit data supplied to said preceding value "1" detecting circuit at the preceding stage show value "0" or not, said value "1" detecting signal transmitting circuit transmitting the detecting signal indicative of value "1" as a basis of the detection of the preceding value "1" to said preceding value "1" detecting circuit at the next stage on the basis of detected results.

2. A preceding value "1" detecting circuit apparatus as claimed in claim, 1, wherein the preceding value "1" detecting circuit judges whether there is value "1" or not with respect to one of the bit data supplied to the divided blocks.

3. A preceding value "1" detecting circuit apparatus as claimed in claim 1, wherein the preceding value "1" detecting circuit begins to detect the preceding value "1" from a most significant bit side of the detected data.

* * * * *